(12) United States Patent  
Hultkrantz et al.

(10) Patent No.: US 8,761,352 B2  
(45) Date of Patent: Jun. 24, 2014

(54) ENHANCED MULTIPARTY CONFERENCE OUTDIAL

(75) Inventors: Jan Hultkrantz, Bromma (SE); Fredrik Pejmo, Bandhagen (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 78 days.

(21) Appl. No.: 13/146,537

(22) PCT Filed: Jan. 27, 2009

(86) PCT No.: PCT/SE2009/050080  
§ 371 (c)(1),  
(2), (4) Date: Jul. 27, 2011

(87) PCT Pub. No.: WO2010/087744  
PCT Pub. Date: Aug. 5, 2010

(65) Prior Publication Data  
US 2011/0286583 A1  Nov. 24, 2011

(51) Int. Cl.  
*H04M 1/64* (2006.01)  
*H04M 3/42* (2006.01)

(52) U.S. Cl.  
USPC ................................... 379/88.01; 379/204.01

(58) Field of Classification Search  
USPC ................. 379/158, 202.01–207.01; 455/416  
See application file for complete search history.

(56) References Cited

U.S. PATENT DOCUMENTS

| | | | |
|---|---|---|---|
| 6,404,876 B1 | 6/2002 | Smith et al. | |
| 2004/0203637 A1 | 10/2004 | Dodla | |
| 2005/0094794 A1 | 5/2005 | Creamer et al. | |
| 2006/0126803 A1 | 6/2006 | Patel et al. | |
| 2008/0032747 A1 | 2/2008 | Holt et al. | |
| 2008/0177626 A1* | 7/2008 | Nguyen | 705/14 |
| 2008/0247530 A1* | 10/2008 | Barton et al. | 379/216.01 |
| 2008/0317219 A1* | 12/2008 | Manzardo | 379/88.01 |
| 2009/0043614 A1* | 2/2009 | Yee | 705/4 |
| 2010/0183126 A1* | 7/2010 | Chambers et al. | 379/88.04 |

FOREIGN PATENT DOCUMENTS

WO    WO 2008/064483 A1    6/2008

OTHER PUBLICATIONS

International Preliminary Report on Patentability, PCT Application No. PCT/SE2009/050080, Apr. 8, 2011 (23 pages).

Written Opinion of the International Searching Authority, PCT Application No. PCT/SE2009/050080, Jan. 27, 2011 (8 pages).

(Continued)

*Primary Examiner* — Fan Tsang  
*Assistant Examiner* — Solomon Bezuayehu  
(74) *Attorney, Agent, or Firm* — Myers Bigel Sibley & Sajovec, PA (57) ABSTRACT

Methods are described for providing conference calls. Methods are performed in a conference call system and includes: receiving local contact information for a plurality of contacts stored in a local phone book of a user equipment associated with a caller; updating a contact database of the conference call system based on the local contact information; registering the caller with an interactive voice response system of the conference call system; receiving a spoken request from the caller; accessing the contact database with contact information and retrieving a phone number responsive to the spoken request; calling the retrieved phone number; and establishing contact between the caller and a person associated with the retrieved phone number. Systems and computer readable mediums are also described.

11 Claims, 7 Drawing Sheets

(56) References Cited

OTHER PUBLICATIONS

International Search Report and Written Opinion, PCT Application No. PCT/SE2009/050080, Oct. 7, 2009 (14 pages).
Open Mobile Alliance, "SyncML Sync Protocol, version 1.1", Feb. 15, 2002, Retrieved on Sep. 23, 2009, Source: http://www.openmobilealliance.org/tech/affiliates/syncml/syncml_sync_protocol_v11_20020215.pdf, chapter 1.2, chapter 5, chapter 6.
Chinese First Office Action Corresponding to Chinese Patent Application No. 200980155518; Issuing Date: Jun. 8, 2013; 2 Pages.
European Search Report Corresponding to European Application No. 09839362.2; Dated: Jul. 2, 2013; 7 pp.

* cited by examiner

ENHANCED MULTIPARTY CONFERENCE OUTDIAL

CROSS REFERENCE TO RELATED APPLICATIONS

This application is a 35 U.S.C. §371 national stage application of PCT International Application No. PCT/SE2009/050080, filed on 27 Jan. 2009, the disclosure and content of which is incorporated by reference herein in its entirety. The above-referenced PCT International Application was published in the English language as International Publication No. WO 2010/087744 A1 on 5 Aug. 2010.

TECHNICAL FIELD

The invention relates to a method, system and computer readable medium for providing teleconferencing that includes using interactive voice response.

BACKGROUND ART

Teleconferencing, which includes voice conferencing and video conferencing, allows a number of persons located in geographically disparate areas to participate in a telephone or video call with one another. As businesses and organizations strive to cut costs such like those for meals, travel and lodging which are related to "person-to-person" meetings, teleconferencing is expected to be to be even more and more attractive.

Many organizations have come to rely upon designated teleconference numbers that can be used for a certain time, where each participant of a teleconference can join the conference by calling such a designated number. Frequently several teleconferencing systems also require a joining participants to provide some kind of identification code before the participant can join to a conference call. The identification code may be a personalized identifier or it may be an identification code associated with the teleconference in question.

Since all participants have to call the same number for joining the conference there is always a risk that someone calls the wrong number or even loses information about what number to call for joining the conference call. In particular as each teleconference can be associated with different teleconference number and identification codes, remembering and keeping track of a such information can sometimes be a hard or maybe even completely impractical task.

Some alternatives for tracking such information when e.g. away from one's computer system or calendaring application may include manually writing down each teleconference number and identification code or may include using a personal digital assistant. Such solutions are unfortunately somewhat prone to error.

For the reasons above various systems have been developed for assisting in the setting up a teleconference between a number of participants.

One way of assisting conference participants in joining a teleconference is disclosed, for example, in U.S. Pat. No. 7,133,512 in which document an interactive voice response system and a method of aggregating conference calls can include registering a caller with the interactive voice response system. Included is also access in a calendar system used by a registered caller for determining teleconference data that specify at least a telephone number for a scheduled conference call. At approximately a time of the conference call the telephone number for the conference call are automatically called. The method also can include establishing contact with the registered caller and joining the registered caller with the conference call.

Even though prior art may assist in setting up a conference call, present solutions are often cumbersome in communication environments were several different communication equipments are used, which includes e.g. cellular telephones, wireless telephones, conventional landline phones, IP-based telephones which includes e.g. a computer.

SUMMARY

In view of the foregoing, it is an object of the invention to provide an improvement of the above techniques and prior art. More particularly, it is an object to provide teleconference calls where several participants may be conveniently included in the teleconference even if they use different types of communication equipments.

Hence a method of providing conference calls is provided, the method performed in a conference call system and comprising the steps of: receiving local contact information for a plurality of contacts stored in a local phone book of a user equipment associated with a caller; updating a contact database of the conference call system in dependence of the local contact information; registering the caller with an interactive voice response system of the conference call system; receiving a spoken request from the caller; accessing the database with contact information and retrieving a phone number in dependence of the spoken request; calling the retrieved phone number; and establishing contact between the caller and a person associated with the retrieved phone number.

Here "local contact information" means information that are stored in a local device such as a cell phone or a personal computer with wireless network capabilities. "Global contact information", which use is further described below, means information that is stored in a database of an organization were the information usually is available for several different persons. In this context, "local" information may be seen as a first set of information while "global" information may be seen as a second set of information.

The inventive method is advantageous in that e.g. a person arranging the conference call conveniently may invite several different participants to the conference. In particular, the arranger do not need to remember the phone number of each participant, and any temporary communication equipment capable of handling voice and/or video calls may be used even if contact information is not available in the communication equipment.

Moreover, persons that are invited to the conference call do not need to connect to the conference themselves but they are instead called by the systems on basis on commands given by the conference arranger.

By using an interactive voice response system the system is even more easy to use, which aggregates to the advantages of the invention.

The spoken request comprises a name and/or a phone number associated with the person that is associated with the retrieved phone number, which is quite convenient for the caller arranging the conference.

The method may further comprise the steps of: receiving global contact information for a plurality of contacts stored in a global phone book of a server associated with an organization; and updating the contact database of the conference call system in dependence of the global contact information. By including global contacts the system is more convenient as every contact must not necessarily be stored in the local phone book.

The spoken request may comprise a name associated with any of the local phone book and the global phone book, for allowing contacts of a certain phone book to be searched by its name and thus providing a more flexible and user-friendliness navigation between contacts in the contact database of the conference call system.

The step of receiving the spoken request from the caller is proceeded by step of receiving a specific dual-tone command from the caller.

The method may comprise the step of receiving a specific dual-tone command from the caller, wherein the step of establishing contact comprises establishing a video conference call or a voice conference call in dependence of a request from the caller.

The step of receiving the local contact information for a plurality of contacts stored in the local phone book may comprise sending the local contact information over a wireless communication network.

According to another aspect of the invention a conference call system for providing conference calls is disclosed, the system being configured to: receive local contact information for a plurality of contacts stored in a local phone book of a user equipment associated with a caller; update a contact database of the conference call system in dependence of the local contact information; register the caller with an interactive voice response system of the conference call system; receive a spoken request from the caller; access the database with contact information and retrieving a phone number in dependence of the spoken request; call the retrieved phone number; and establish contact between the caller and a person associated with the retrieved phone number.

According to yet another aspect of the invention, a computer readable medium is provided, having stored thereon a computer program having software instructions which when run in a conference call system cause the system to perform the steps of: receiving local contact information for a plurality of contacts stored in a local phone book of a user equipment associated with a caller; updating a contact database of the conference call system in dependence of the local contact information; registering the caller with an interactive voice response system of the conference call system; receiving a spoken request from the caller; accessing the database with contact information and retrieving a phone number in dependence of the spoken request; calling the retrieved phone number; and establishing contact between the caller and a person associated with the retrieved phone number.

The inventive system and computer readable medium may comprise, be configured to execute and/or having stored software instructions for performing any of the features described above in association with the inventive method, and has the corresponding advantages.

BRIEF DESCRIPTION OF THE DRAWINGS

Embodiments of the invention will now be described, by way of example, with reference to the accompanying schematic drawings, in which.

DETAILED DESCRIPTION OF PREFERRED EMBODIMENTS

Figure 1:
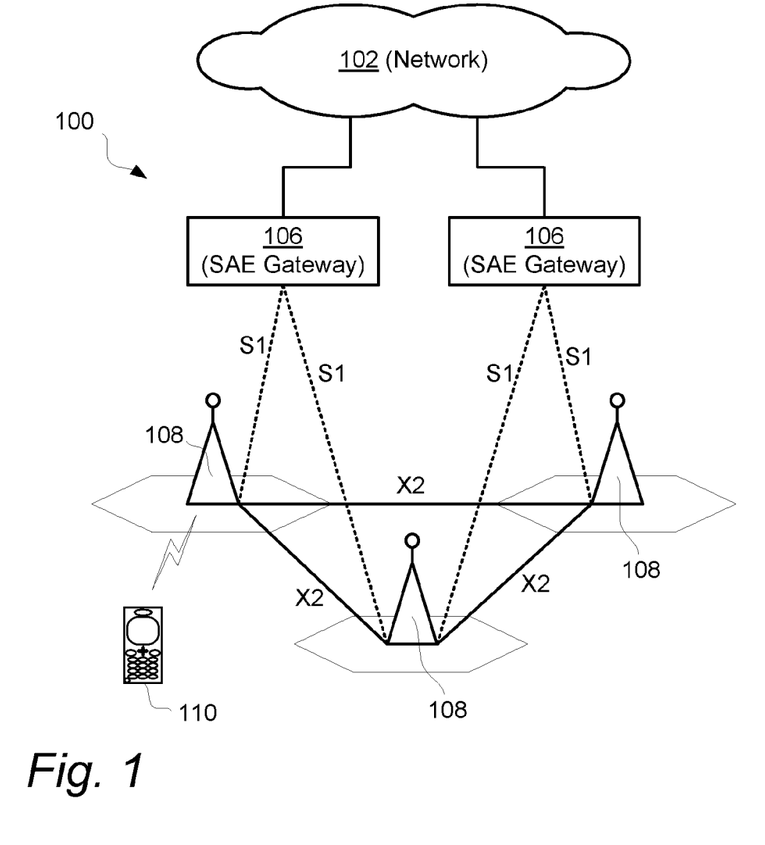
FIG. 1 illustrates a wireless communication system.

With reference to FIG. 1 a telecommunication system 100 implementing a part of the invention is illustrated. The system 100 is designed and specified in accordance with the next generation of wireless communication networks that is currently ongoing under the auspices of the $3^{rd}$ Generation Partnership Project (3GPP), in an effort known as the Long Term Evolution (LTE) initiative; referred to as 3PP LTE release 8. Along with the definition of new wireless interfaces, a new core network architecture is also being defined in a standardization effort referred to as System Architecture Evolution (SAE).

As shown in FIG. 1, the communication system 100 is an LTE/SAE network that includes at least two types of network elements supporting user and control planes, i.e. an enhanced base station 108 called the Evolved NodeB or "eNodeB", and the SAE Gateway 106. The eNodeB 108 provides the LTE air interface and radio resource management while the SAE Gateway 106 provides a mobility anchor point for the user plane and provides a gateway to an IP service network 102 that may include the Internet, intranets, and other IP-based service networks. Each eNodeB is connected to a SAE Gateway 106 using the S1 interface as defined by 3GPP specifications, and the X2 interface which also is defined in accordance with 3PP specifications connects any eNodeB in the network with any other eNodeB that has a neighboring cell. Each of the eNodeBs 108 is capable of wireless communication with a user equipment (UE) 110 as specified by 3PP LTE release 8.

In the description that follows, synchronization of contact information in the UE 110 (local contact information) with a contact database of a conference call system is done by using the described LTE/SAE wireless network, which is particularly suitable for transmitting large amounts of data.

However, even though the synchronization is performed by using an LTE/SAE wireless network, other network configurations may be used as well such as those based on an evolved High-Speed Packet Access (HSPA) architecture, in which the Radio Network Controller (RNC) is integrated into the NodeB, as well as to a Release 99 GERAN/UTRAN architecture. Thus, the description in terms of LTE/SAE network elements is meant to be illustrative, not limiting.

Figure 2:
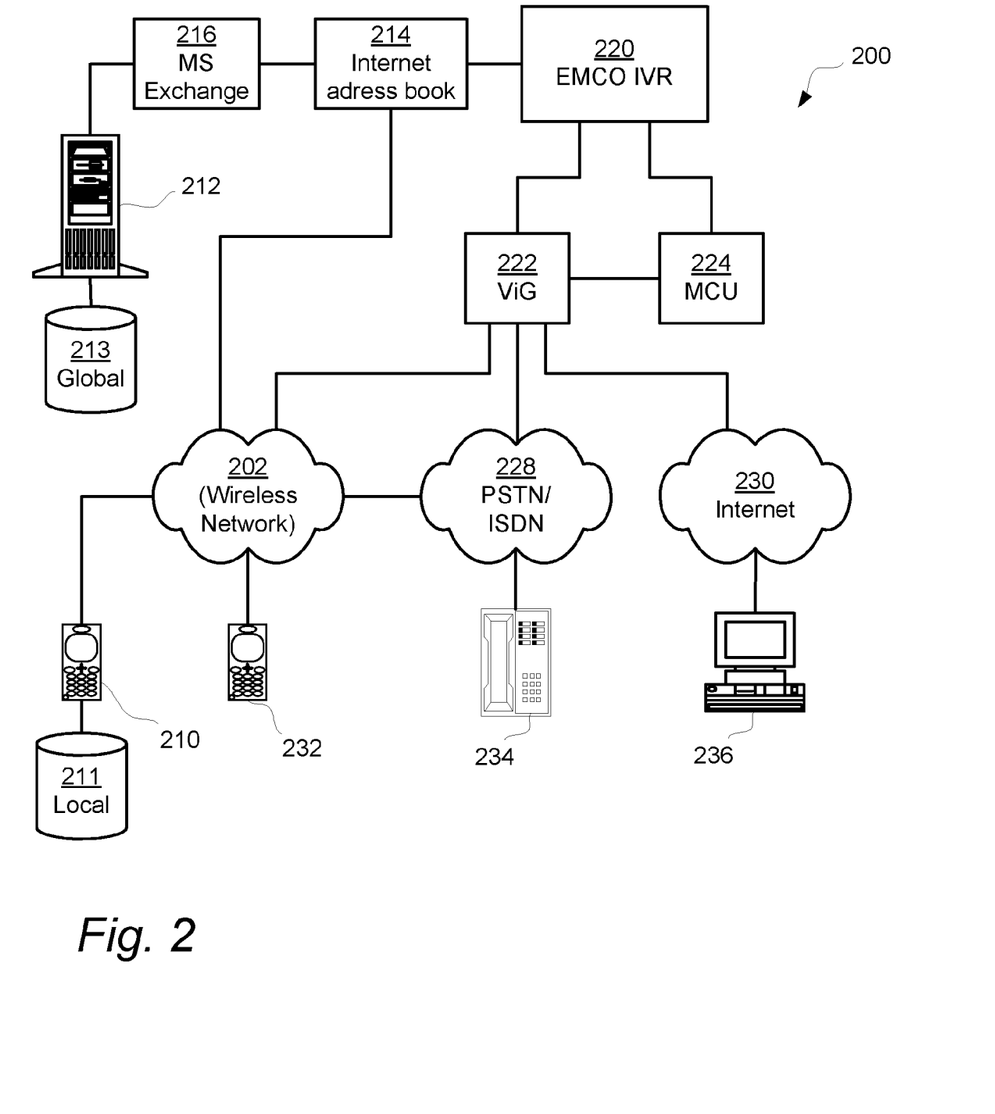
FIG. 2 illustrates schematically a system for providing conference calls an accordance with an embodiment of the invention.

With reference to FIG. 2 a system 200 for providing conference calls is shown. As may be seen in the figure the system 200 includes an Enhanced Multiparty Conference Outdial (EMCO) unit 220 with an Interactive Voice Response (IVR) system. The IVR system includes a combined automatic speech recognition (ASR) and text-to speech (TTS) engine and operates in a manner known within the art. The EMCO IVR unit 220 and hence the automatic speech recognition and text-to speech engine is connected to an Internet address book 214. For internal communication in the EMCO unit 220, e.g. between the automatic speech recognition, text-to speech engine and other functions of the EMCO unit 220, the EMCO IVR unit 220 may use the Media Resource Protocol and Simple Object Access Protocol (SOAP) which allows convenient implementation.

The Internet address book 214 is in turn functionally connected to a server 212 which has a database 213 that holds global contact information for a number of persons and organizations. To synchronize the global contact information a contact and e-mail application like e.g. a Microsoft Exchange Server (MS Exchange) 216 may connect the server 212 to the Internet address book 214. Of course, the Microsoft Exchange Server 216 may reside on the server 212 and the synchronization may be conducted by using the synchronization standard SyncML or the OMA Device Management protocol which is a protocol specified by the Open Mobile Alliance (OMA) Device Management (DM) Working Group and the Data Synchronization (DS) Working Group. This allows, for example, immediate synchronization of the global contact information with the Internet address book 214 as soon as a new entry has been done in the global contact information. The global contact information may include e.g. all contacts of an organization, all contacts associated with a sub-department of the organization, all customer contacts within a certain geographic area or it may include any other grouping (geographical, functional etc.) of contacts related to the organization.

A video gateway system (ViG) 222 and a therewith interconnected multiparty conference unit (MCU) 224 are both connected with the EMCO IVR unit 220. For providing communication with a mobile user equipment (UE) 232, a conventional landline phone 234 and an IP telephone such as a computer 236 the system 200 includes networks like the Internet 230, a combined public switched telephone network and integrated services digital network (PSTN/ISDN) 228 and a wireless network 202 that includes the telecommunication system 100 of FIG. 1. These networks 202, 228, 230 are via the video gateway system 222 connected to the EMCO IVR unit 220 which performs call controls functions such as receiving inbound calls, initiating outbound calls, transferring calls and similar functions.

In detail, the Internet address book 214 may be e.g. an address book provided by a company like O3SIS AG, which provides automatic synchronization of contact information into a so called Unified Mobile Directory (UMD). Even more specifically, the Internet address 214 book may be an address book like the one provided on the website www.plaxo.com on 22 Jan. 2009. From this it follows that the Internet address book 214 resides on a server (not shown) which uses a memory device (not shown) for storing data of the Internet address book 214.

Included in FIG. 2 is a user equipment 210 belonging to a caller (A-party) that may set up a teleconference call with persons (B-party, C-party, D-party and so on) using e.g. the user equipment 232, the conventional landline phone 234 and the IP telephone device 236.

The user equipment 210 has a memory in the form of e.g. a RAM, ROM or a flash memory or any other memory suitable for storing data digitally. On this memory a database 211 resides and stores local contact information, i.e. information like phone numbers, e-mail addresses etc. associated with persons stored as contacts in the user equipment 210 of the A-party.

The local contact information in the database 211 is synchronized with the content in the Internet address book 214 by transmitting the local contact information via the wireless network 202 to the Internet address book 214. This may be done without using the EMCO IVR unit 220. When synchronization is performed, data pertaining to the contacts in the local database 211 is transmitted to the Internet address book 214 to be stored there as well.

The synchronization of the local contact information in the user equipment 210 with the Internet address book 214 is conducted by using the earlier mentioned platform-independent information synchronization standard SyncML (or the OMA Device Management protocol) for allowing, for example, immediate synchronization of the local phone book of the user equipment 210 with the Internet phone book 214 as soon as a new entry has been done in the user equipment 210.

Even though not illustrated, the Internet address book 214 may be synchronized with various other Internet address book currently available on the market.

The EMCO IVR unit 220 communicates with the video gateway system 222 and the multiparty conference unit 224 by using the Session Initiation Protocol (SIP) and the Real-time Transport Protocol (RTP). Communication with the application interface of the multiparty conference unit 224 is set up by using Extensible Markup Language (XML), while the Simple Object Access Protocol is used for communication with the Internet address book 214 and the automatic speech recognition (ASR) function and text-to speech (TTS) function in the EMCO IVR unit 220.

The system 200 can enable the A-party who has the Internet address-book 214 being synchronized with the address book in the UE 210, to invite participants to a multiparty conference and to switch between a voice conference and a video conference.

This is done by the A-party dialing a conference number and having a voice or a video call established with a multiparty conference bridge equipped with the new EMCO IVR unit 220, or having a voice or a video call established with a stand-alone EMCO IVR unit 220 which has the needed connections to the conference bridge. At the start up of the conference the A-party can invite participants and change conference type by: saying the names from the A-party's address book belonging to participants to be called by the bridge; saying the number of a participant to be called by the bridge; or by ordering the EMCO IVR 220 to retrieve a participants phone number from another address book than the personal address book (e g from a company's address book or a general Internet address book) and by saying the name of this participant.

During the conference the A-party may add one or several participants to the conference by sending a pre-defined Dual-tone multi-frequency (DTMF) signaling command to re-activate the EMCO IVR 220 and then select any of the invitation options described above via voice or via another DTMF command. When the selection of a new participant is completed the A-party is rejoined in the ongoing conference. During the conference the A-party may also switch an ongoing voice conference to a video conference and vise versa. Then the A-party re-activates EMCO IVR 220 as earlier described and then orders the switching via a voice command or via a DTMF command. The pre-defined DTMF signaling command may be specified by e.g. Request for Comments 2833 (RFC 2833) issued by the Network Working Group. On Jan. 26, 2009 RFC 2833 was available on http://www.ietf.org/rfc/rfc2833.txt.

In addition to the multiparty conference related capabilities described above the EMCO IVR 220 also allows the A-party to, by placing a voice call or a video telephony call to EMCO IVR 220, utilize the same command mechanisms to set up a person to person call to a B-party as well as to switch between voice and video call. The person to person call can then, at any time during the call, be extended to a multiparty conference call by inviting additional participants.

The EMCO IVR 220 is also arranged to allow the A-party to, at any time during a person to person call or during a multiparty call, set up a new separate call to a new party. The A-party can then also order the EMCO IVR 220 to join this new party into a multiparty conference with previous parties or previous multiparty conference participants.

If a voice call or a video telephone call from the A-party to a B-party is routed via the EMCO IVR 220 when the B-party number is already included in the call set up signaling from the A-party, the A-party can, at any time during the call, invoke and utilize the relevant EMCO IVR unit capabilities described above.

Apart form the EMCO IVR unit 220 comprising known, generic voice and video interactive voice response functionality, more advanced functionality is included as described below.

For example, a caller may by voice prompt for an EMCO voice and DTMF command as well as sequences performed by the EMCO IVR 220.

The EMCO IVR unit 220 has also functionality to determine that new participants shall be invited to the multiparty conference, or that a B-party shall be called, via voice call or via a video/multimedia call according to the type of call EMCO IVR 220 receives from the A-party, and functionality to identify that this call shall be changed if such a voice or DTMF command is received by the A-party for the name or number of the participant to be added. Functionality to identify what type of address book that shall be used for the next participant to be added or the B-party to be called is also included in the EMCO IVR unit 220 as well as functionality to retrieve a participant number/B-party number or name@domain address from the identified type of address book. The EMCO IVR unit 220 has also: functionality to utilize the Caller Line Identification (CLI) from the A-party to retrieve a participant number/B-party number or name@domain address from a personal address book (or e g a company address book); functionality to register a number via voice command from the A-party to be used for a participant to be added or a B-party to be called; functionality to store all the participants' numbers and name@domain addresses for each conference until the conference has ended; and functionality to store the A-party and B-party numbers or name@domain addresses until the call has ended.

The EMCO IVR unit 220 has further: functionality to compile and communicate the needed commands towards the multiparty conference unit 224 when the A-party has confirmed the completion of commands and selection of participants for starting the conference; functionality to connect the A-party call leg with the multiparty conference unit 224 call leg when the call leg with the multiparty conference unit 224 has been established; functionality to initiate call set up signaling and to establish a call directly with a B-party (without involving an multiparty conference unit 224) when a person to person call has been ordered by the A-party; functionality to connect the A-party call leg with the B-party call leg when the call leg with the B-party has been established; functionality for EMCO IVR unit 220 to continue to "sniff" the DTMF commands sent by the A-party; and functionality to transparently transmit non EMCO IVR related commands sent via DTMF signals by the A-party.

When a DTMF command to re-activate the EMCO IVR command handling is sent by the A-party and detected by EMCO IVR, there is functionality to mute the call leg between EMCO IVR and MCU, or the call leg between EMCO IVR init 220 and the B-party, and to connect media and signaling channels from the A-party call leg back to the EMCO IVR unit 220, and to start sending voice prompts to the A-party at this stage.

The EMCO IVR unit 220 has also more functionality, such as functionality to compile and communicate the needed additional commands towards the multiparty conference unit 224 when the A-party has confirmed the completion of additional commands/selection of additional participants, and functionality to re-connect the A-party call leg with the multiparty conference unit 224 call leg at completion of additional commands/selection of additional participants.

When the A-party orders a person to person call to be upgraded to a multiparty conference call, the EMCO IVR unit 220 has functionality to compile and communicate the needed additional commands towards the multiparty conference unit 224 and when the A-party has confirmed the completion of additional commands/selection of additional participants (one or several). The EMCO IVR unit 220 will then order two of the out-dialed calls from the multiparty conference unit 224 towards itself: one as a moderator and one as a participant. The multiparty conference unit 224 will be ordered to out-dial a third call directly to a C-party. In this case the EMCO IVR unit 220 has also functionality to bridge the moderator call leg with the A-party and the participant call leg with the B-party and, optionally, functionality to re-invite the B-party to the participant call from the multiparty conference unit 224 to release the B-party call leg.

Also included is functionality to change an ongoing voice conference to a video conference or an ongoing video conference to a voice conference, when a predetermined voice command or DTMF command is received from the A-party, by performing the following actions: sending a command to the multiparty conference unit 224 to release the ongoing conference; retrieving from store all the participants' numbers and name@domain addresses; and sending a second command to the multiparty conference unit 224 to initiate a new video or voice conference with this list of participants with the addition of EMCO IVR unit 220 as moderator.

Other EMCO IVR functionality includes changing an ongoing person to person voice call to a video call or an ongoing video call to a voice call, when a predetermined voice command or DTMF command is received from the A-party, by performing the following actions: releasing the ongoing call; retrieving from store the A-party and B-party numbers or name@domain addresses; and initiating new video or voice calls towards the A-party and the B-party and bride the two call legs when they have been established.

When the A-party orders EMCO IVR unit 220 to perform a separate call to a new party there is functionality to: identify a C-party number or name@domain address according to the mechanisms described above; initiate call set up signaling and to establish a call with the C-party; connect the A-party call leg with the C-party call leg when the call leg with the C-party has been established; enable the A-party to switch between the C-party connection and the B-party (or multiparty conference unit) connection; and enable the A-party to release the C-party call or the original call and resume the remaining call.

If the A-party orders the EMCO IVR unit 220 to join the C-party into a multiparty conference together with a B-party there is in the EMCO IVR unit 220 functionality to join the C-party by ordering the multiparty conference unit 224 to invite EMCO IVR unit 220 as three different participants of which one as a moderator; and functionality to connect a multiparty conference unit-EMCO IVR unit moderator with the A-party call leg and the two other multiparty conference unit-EMCO IVR unit call legs with the B-party call leg and the C-party call leg respectively.

If the A-party orders the EMCO IVR unit 220 to join the C-party to be joined into an ongoing multiparty conference call, the C-party is joined by ordering the multiparty conference unit 224 to invite EMCO IVR unit 220 as an additional participant, this new multiparty conference unit-EMCO IVR unit call leg is connected with the C-party call leg, and the A-party call leg is reconnected with the initial multiparty conference unit-EMCO IVR unit moderator call leg.

B-party routing may be handled via the EMCO IVR unit 220 with direct call set up signaling and establishment. For such calls EMCO IVR unit commands and mechanisms are invoked as described above for such calls.

Figure 3:
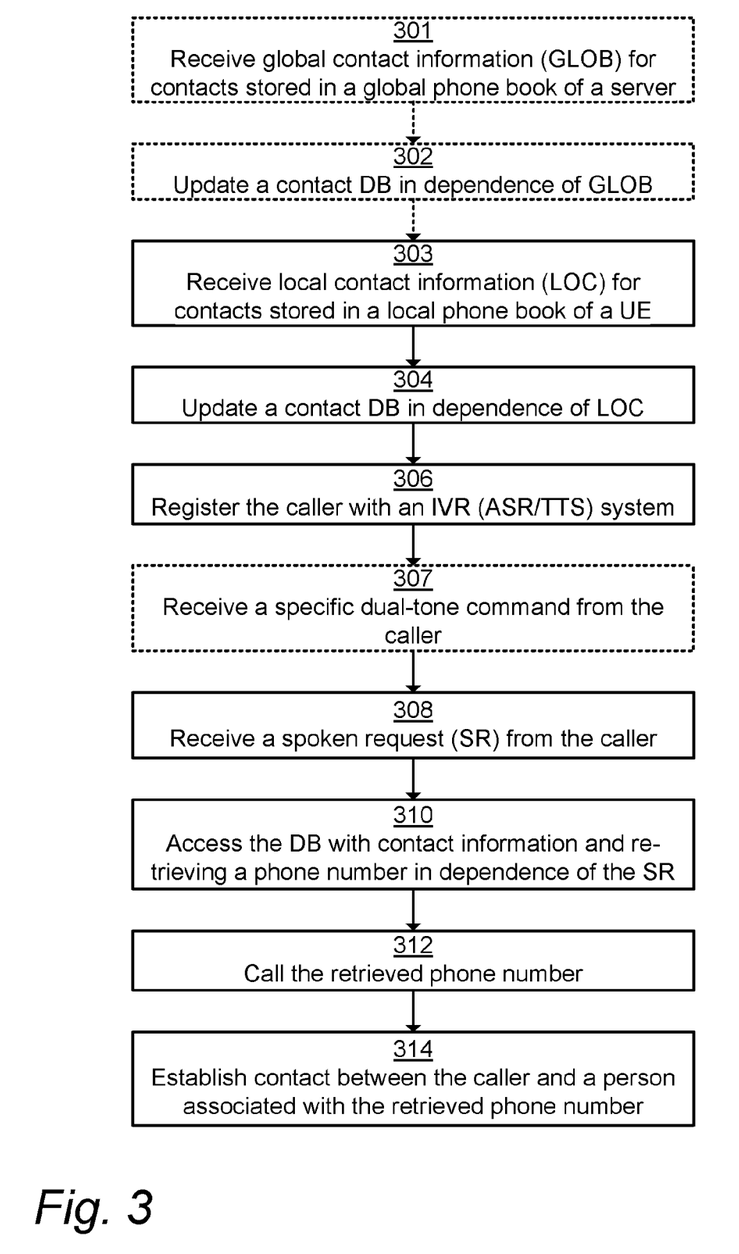
FIG. 3 is a flow chart that illustrates a method of providing conference calls in accordance with an embodiment of the invention.

With reference to FIG. 3 the general steps performed by the system 200 are shown, were the first step includes receiving 301 global contact information from e.g. an organizations phone book and then updating 302 the Internet address book 214 with this information. These two first steps 301 and 302 are in the basic configuration optional steps and are hence illustrated with dashed lines, but the steps are preferably included for increasing the service level of the system 200.

In any case the local contact information is received 303 from the user equipment 210 of the A-party and is subsequently stored 304 in the Internet address book 214. Of course, this type of synchronization may be performed as described above or according to known synchronization methods, which may then include that only information that is not present in the Internet address book 214 in comparison with the local contact information is updated.

When the Internet address book 214 is updated the system 200 registers 306 the A-party with the EMCO IVR unit 220 as soon as the A-party initiates a teleconference call. Once the registration is complete the system may, again at the EMCO IVR unit 220, receive 308 a spoken request from the A-party. Optionally the step of receiving 308 a spoken request is preceded by a step of receiving 307 a DTMF command for activating a certain functionality of the EMCO IVR unit 220, such as, in case a teleconference is ongoing, activating the functionality to receive 308 a spoken request.

The spoken request typically comprises a name of a person, a phone number or a phone book identifier name, and in case the spoken request is a name or a number, the EMCO IVR unit 220 accesses 310 the Internet address book 214 and the contacts therein is searched in dependence of the spoken request (name or number). Once a contact (B-party) corresponding to the request is found the phone number or any other contact information (email address etc.) is retrieved form the Internet address book 214 and is returned to the multiparty conference unit 224 as a E.164 phone number. As known within the art, E.164 is a recommendation by the Telecommunication Standardization Sector that defines the international public telecommunication numbering plan used in the public switched telephone network and other data networks.

In case a phone book identifier name was given by the A-party, this identifier is used in combination with e.g. a persons name to search the relevant phone number. Then only persons belonging to a section of the Internet address book 214 corresponding to the phone book identifier name are searched and matched against the name of the person.

Thereafter the multiparty conference unit 224 uses the returned phone number for calling 312 and establishing 314 contact between the A-party and the B-party for allowing the teleconference call to take place.

With reference to FIGS. 4a-4d communication between entities of the system 200 of FIG. 2 is illustrated, where, as an example, a multiparty video conference call is initiated by the user equipment 210 of FIG. 2.

Figure 4A:
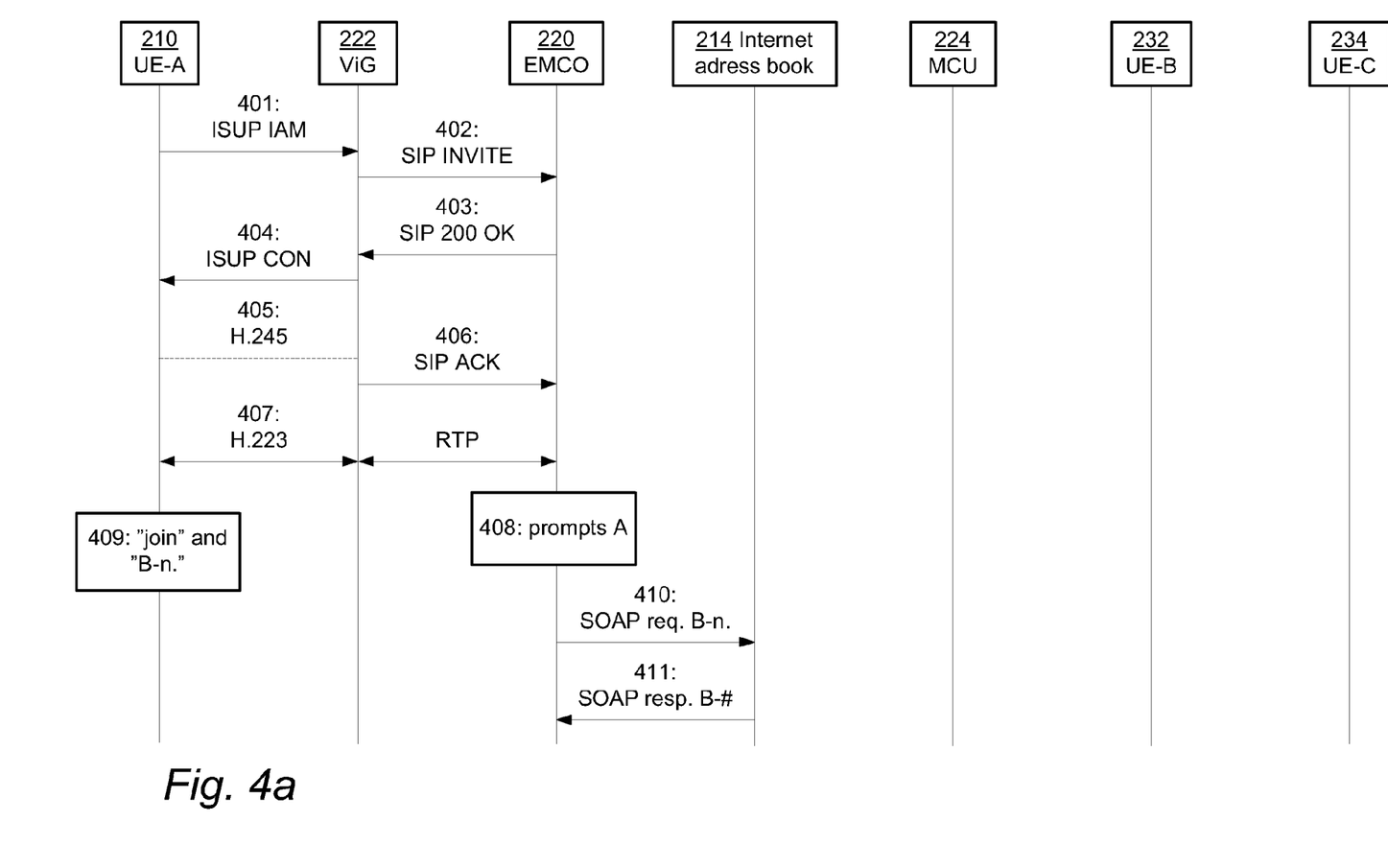
FIGS. 4a-4d show a process diagram illustrating communication between entities of the invention.

First the user equipment 210 which is used by the A-party setting up the conference uses 401 the ISUP Initial Address Message (IAM) which is the first message sent to inform the video gateway system 222 that a call has to be established. Here ISUP (ISDN User Part) is part of the Signaling System no. 7 which in turn is a set of known telephony signaling protocols used to set up public switched telephone network telephone calls, as specified by the ITU-T as part of the Q.76x series.

Next 402 a SIP INVITE method is used by the video gateway system 222, and the EMCO IVR unit 220 responds 403 to the video gateway system 222 with a SIP 200 OK response, and then the video gateway system 222 sends 404 an ISUP CON message to the user equipment 210.

The setup includes using 405 a H.245 control channel protocol and includes using 406 the SIP ACK method to indicate that a call is going to be setup. The H.223 protocol is used 407 for the video conference which is a sub-protocol in the 3GPP umbrella protocol 3G-324M for video telephony in 3G mobile networks. Data between the video gateway system 222 and the EMCO IVR unit 220 is sent by using the Real-time Transport Protocol (RTP) that defines a standardized packet format for delivering audio and video over the Internet.

Next the EMCO IVR 220 prompts 408 the A-party for a command. The A-party says 409 "join" which is a predefined voice-command that is recognized by the EMCO IVR unit 220, and then says a name of a person to be called and subsequently joined in the conference call. This person is referred to as a B-party and uses the user equipment 232. The EMCO IVR unit 220 uses 410 the Simple Object Access Protocol for requesting from the Internet address book 214 a phone number of the B-party and in return the Internet phone 214 book returns 411 the correct phone number. The search for phone numbers in the Internet address book 214 in dependence of the name of the B-party is done according to methods known within the art, which includes confirming 412 that the retrieved phone number is the correct one.

Figure 4B:
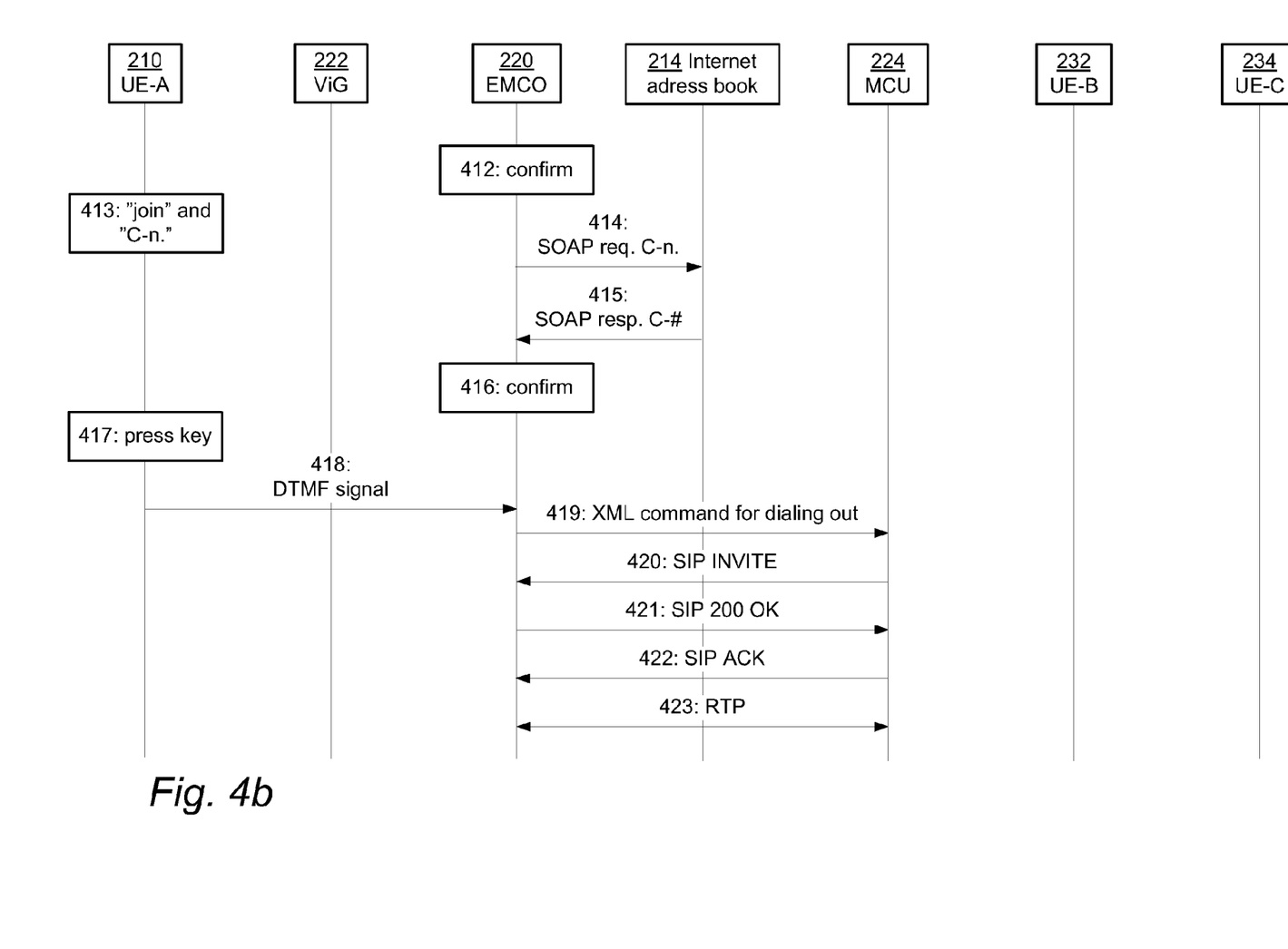

Thereafter the A-party again says 413 "join" and a name of a further person (C-party) that shall be included in the conference call. Next steps 414, 415 and 416 are taken to retrieve the phone number of the C-party, which steps are similar with those taken for the retrieving the phone number of the B-party. When no further conference participants shall be included the A-party presses 417 a key on the user equipment 210 for sending 418 a predefined DTMF signal to the EMCO IVR unit 220, indicating that no further conference participants shall be joined at the moment.

Next the EMCO IVR unit 220 uses 419 a XML command for dialing out to the multiparty conference unit 224, which responds 420 with the SIP INVITE method. The EMCO IVR unit 220 sends 421 a SIP 200 OK response which response is replied 422 to by the SIP ACK method. Again, the Real-time Transport Protocol is used 423 for the communication. Finally the A-party is connected 424 to the EMCO IVR unit 220.

Figure 4C:
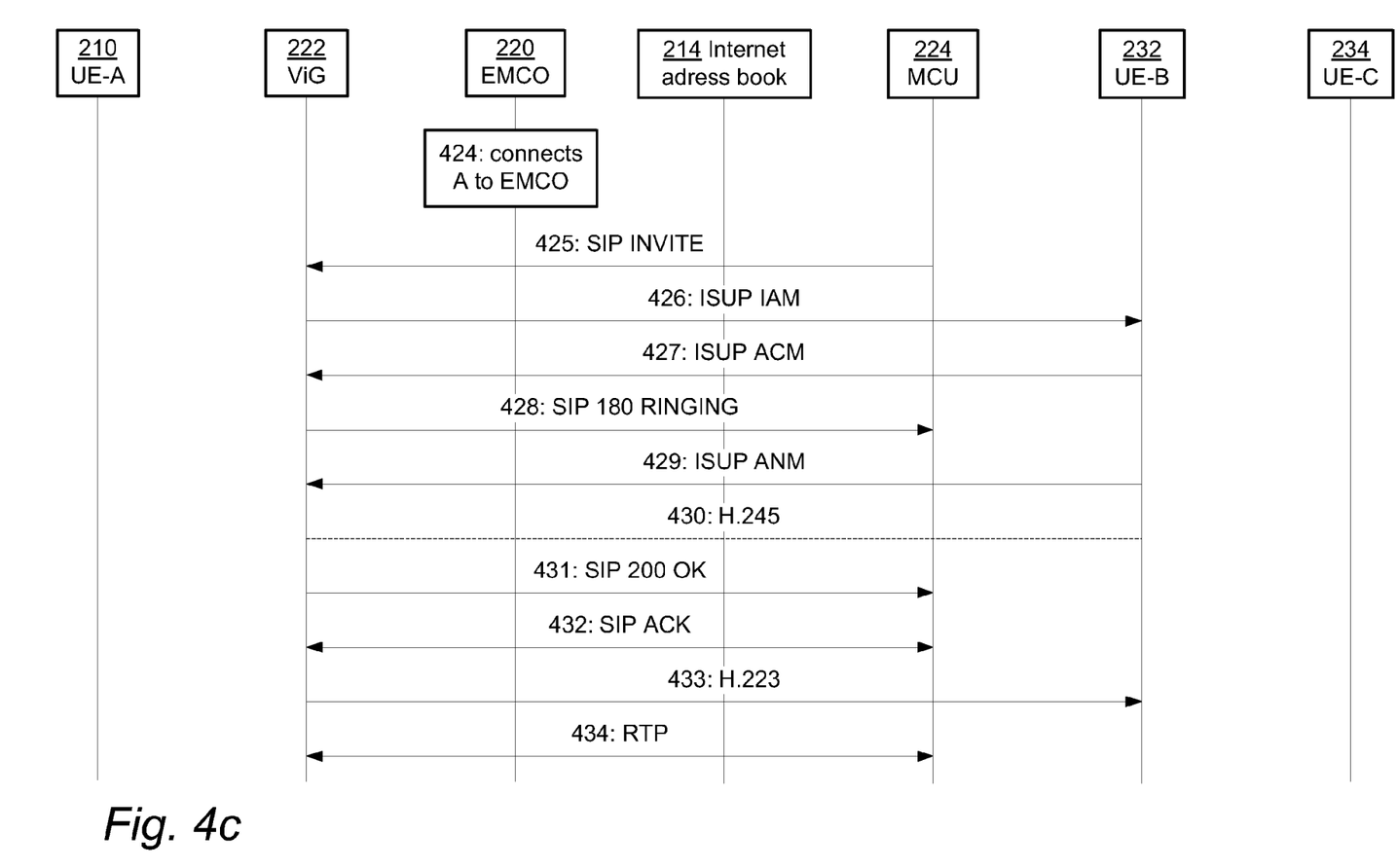

For connecting the B-party to the multiparty conference unit 224 the SIP INVITE method is used 425, a ISUP IAM message is sent 426, an Address Complete Message (ACM) is returned 427 from the user equipment 232 and the SIP RINGING method used 428. When the B-party picks up the user equipment 232 an Answer Message (ANM) is sent 429. The H.245 control channel protocol is used 430, a SIP 200 OK response is sent 431 and a the SIP ACK method is used 432 to indicate that the call is going to be setup. Again, the H.223 protocol is used 433 for the video conference and the Real-time Transport Protocol defines the delivery of audio and video.

Figure 4D:
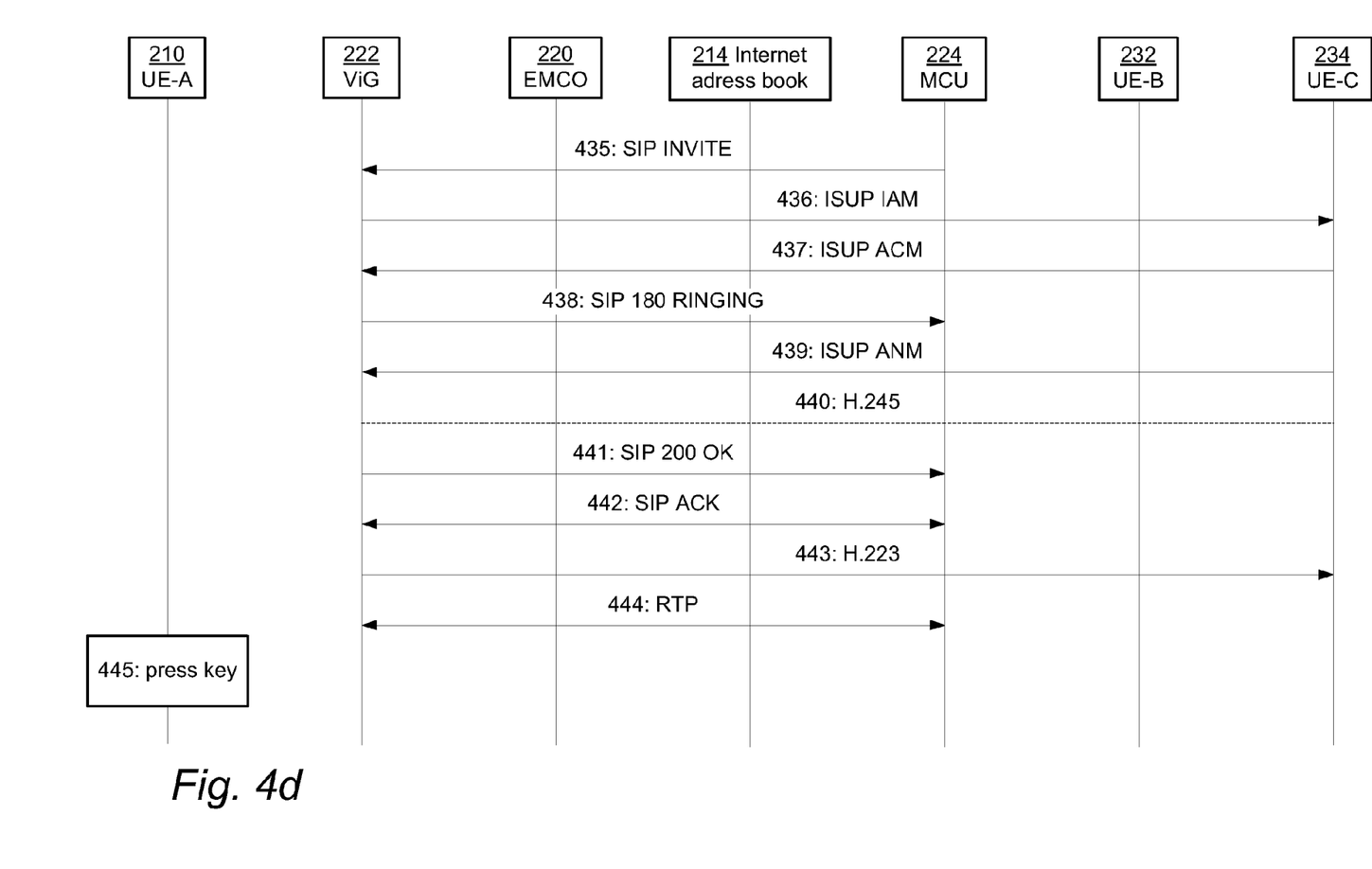

To set up the C-party, as may be seen in the figures steps 435-444 are taken in a manner similar with the steps taken for setting up the conference call with the B-party. When the conference it taken place, the A-party may at any time press 445 a key on his user equipment 210 for activating a DTMF command that initiates pre-defined commands for e.g. adding further participants to the conference, switching between video and audio conference and vice versa, and putting one party on hold when conferencing with other parties.

Of course, as the skilled person realizes, the steps taken in FIGS. 4a-4b are only schematic for illustrating the setting up of the conference all. Further conventional steps may be taken and any suitable protocols and standards as well as various types of networks may be used.

Computer program code for carrying out methods performed in the previously discussed system may for development-convenience be written in a high-level programming language such as Java, C, and/or C++ but also in other programming languages, such as, but not limited to, interpreted languages.

Some modules or routines may be written in assembly language or even micro-code to enhance performance and/or memory usage. It will be further appreciated that the functionality of any or all of the program modules may also be implemented using discrete hardware components, one or more application specific integrated circuits, or a programmed digital signal processor or microcontroller.

Of course, the various communication interfaces described herein are implemented according known standards and protocols. In fact, the invention may be implemented on telecommunication systems that already include a system for interactive voice response and capabilities to synchronize an Internet address book and subsequently search for data therein, without needing any hardware adaptation of the system.

Although various embodiments of the invention have been described and shown, the invention is not restricted thereto, but may also be embodied in other ways within the scope of the subject-matter defined in the following claims. In particular, the invention may be implemented by using other communication interfaces than the ones mentioned herein.

The invention claimed is:

1. A method of providing conference calls, the method performed in a conference call system and comprising:
receiving global contact information for a plurality of contacts stored in a global phone book of a server associated with an organization;
updating a contact database of the conference call system based on the global contact information;
receiving, via a wireless network, local contact information for a plurality of contacts stored in a local phone book of a user equipment associated with a caller;
updating the contact database of the conference call system based on the local contact information;
registering the caller with an interactive voice response system of the conference call system;
receiving a first spoken request from the caller at the interactive voice response system, preceded by receiving a first dual-tone command from the caller at the interactive voice response system;
accessing the contact database with contact information and retrieving a phone number responsive to the spoken request;
calling the retrieved phone number;
establishing contact between the caller and a person associated with the retrieved phone number, and establishing a video conference call or a voice conference call responsive to the first spoken request from the caller; and
switching between the video conference call and the voice conference call responsive to a second dual-tone command from the caller or a second spoken request from the caller.

2. A method according to claim 1, wherein the spoken request comprises a name associated with the person associated with the retrieved phone number.

3. A method according to claim 1, wherein the spoken request comprises a phone number associated with the person associated with the retrieved phone number.

4. A method according to claim 1, wherein the spoken request comprises a name associated with at least one of the local phone book and the global phone book.

5. A method according to claim 1, wherein receiving the local contact information for the plurality of contacts stored in the local phone book comprises sending the local contact information over a wireless communication network.

6. A conference call system for providing conference calls. the system being configured to:
receive global contact information for a plurality of contacts stored in a global phone book of a server associated with an organization;
update a contact database of the conference call system based on the global contact information;
receive local contact information for a plurality of contacts stored in a local phone book of a user equipment associated with a caller;
update the contact database of the conference call system based on the local contact information;
register the caller with an interactive voice response system of the conference call system;
receive a first spoken request from the caller at the interactive voice response system, preceded by receiving a first dual-tone command from the caller at the interactive voice response system;
access the contact database with contact information and retrieving a phone number responsive to the spoken request;
call the retrieved phone number;
establish contact between the caller and a person associated with the retrieved phone number, and establish a video conference call or a voice conference call responsive to the first spoken request from the caller; and
switching between the video conference call and the voice conference call responsive to a second dual-tone command from the caller or a second spoken request from the caller.

7. A system according to claim 6, wherein the spoken request comprises a name associated with the person associated with the retrieved phone number.

8. A system according to claim 6, wherein the spoken request comprises a phone number associated with the person associated with the retrieved phone number.

9. A system according to claim 6, wherein the spoken request comprises a name associated with at least one of the local phone book and the global phone book.

10. A system according to claim 6, wherein the receiving of the local contact information for the plurality of contacts stored in the local phone book comprises sending the local contact information over a wireless communication network.

11. A non-transitory computer readable medium having stored thereon a computer program having software instructions which when run in a conference call system cause the system to perform operations comprising:
receiving global contact information for a plurality of contacts stored in a global phone book of a server associated with an organization:
updating a contact database of the conference call system based on the global contact information;

receiving, via a wireless network, local contact information for a plurality of contacts stored in a local phone book of a user equipment associated with a caller;

updating the contact database of the conference call system based on the local contact information;

registering the caller with an interactive voice response system of the conference call system;

receiving a first spoken request from the caller at the interactive voice response system, preceded by receiving a first dual-tone command from the caller at the interactive voice response system;

accessing the contact database with contact information and retrieving a phone number responsive to the spoken request;

calling the retrieved phone number;

establishing contact between the caller and a person associated with the retrieved phone number, and establishing a video conference call or a voice conference call responsive to the first spoken request from the caller; and switching between the video conference call and the voice conference call responsive to a second dual-tone command from the caller or a second spoken request from the caller.

* * * * *